United States Patent
Choi et al.

(10) Patent No.: US 10,205,654 B2
(45) Date of Patent: Feb. 12, 2019

(54) METHOD FOR PROVIDING BIO-INSPIRED ROUTING PROTOCOL USING OVERHEARING AND PROBABILISTIC PATH FINDING IN MOBILE AD HOC NETWORKS AND SYSTEM THEREOF

(71) Applicant: AGENCY FOR DEFENSE DEVELOPMENT, Daejeon (KR)

(72) Inventors: Hyun-Ho Choi, Seongnam-si (KR); Bong-Soo Roh, Sejong (KR); Jung-Ryun Lee, Seoul (KR); Myoung-Hun Han, Daejeon (KR); Jeung-Won Choi, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 205 days.

(21) Appl. No.: 15/256,904

(22) Filed: Sep. 6, 2016

(65) Prior Publication Data
US 2017/0078191 A1 Mar. 16, 2017

(30) Foreign Application Priority Data
Sep. 14, 2015 (KR) .......................... 10-2015-0129804

(51) Int. Cl.
*H04L 12/707* (2013.01)
*H04W 40/02* (2009.01)
(Continued)

(52) U.S. Cl.
CPC .............. *H04L 45/24* (2013.01); *H04L 45/54* (2013.01); *H04L 45/74* (2013.01); *H04W 40/02* (2013.01);
(Continued)

(58) Field of Classification Search
CPC ......... H04L 45/24; H04L 45/54; H04L 45/74; H04W 40/02; H04W 84/18
See application file for complete search history.

(56) References Cited

U.S. PATENT DOCUMENTS 9,910,982 B2 * 3/2018 Chow .................. G06F 21/552

FOREIGN PATENT DOCUMENTS

KR 2011-0132019 A 12/2011
KR 2012-0102971 A 9/2012

OTHER PUBLICATIONS

Xun-bing Wang et al., "Ant Colony Optimization and Ad-hoc On-demand Multipath Distance Vector (AOMDV) Based Routing Protocol", IEEE Fourth International Conference on Natural Computation, pp. 589-593, 2008 (Year: 2008).*

(Continued)

*Primary Examiner* — Un C Cho
*Assistant Examiner* — Yu-Wen Chang
(74) *Attorney, Agent, or Firm* — LRK Patent Law Firm

(57) ABSTRACT

A method and system for providing a bio-inspired routing protocol using overhearing and probabilistic path finding in a mobile ad hoc network is provided, which can provide correct routing information for a destination, prevent a stagnation problem that repeatedly finds the same path because path finding depends mainly on regular pheromone values, also prevent the unnecessary creation of proactive ant packets and the increase of overhead which are caused by the stagnation problem, and decrease the probability with which an alternative path to be used in the event of link failure cannot be secured in advance.

9 Claims, 19 Drawing Sheets

(51) Int. Cl.
*H04L 12/741* (2013.01)
*H04W 40/26* (2009.01)
*H04W 84/18* (2009.01)
*H04L 12/721* (2013.01)

(52) U.S. Cl.
CPC .......... *H04W 40/26* (2013.01); *H04L 45/123* (2013.01); *H04W 84/18* (2013.01)

(56) References Cited

OTHER PUBLICATIONS

Monteiro et al. "Concave minimum cost network flow problems solved with a colony of ants", Journal of Heuristics Feb. 2013, vol. 19, Issue 1, pp. 1-33. (Year: 2013).*

* cited by examiner

EXPLORATION ANT TRANSMISSION AND OVERHEARING

SENDING Hello+ MESSAGE FROM ONE-HOP NEIGHBOR

ANT EXPLORATION WITHIN ONE-HOP COVERAGE

PERFORM ANT EXPLORATION PERIODICALLY
IN PROBABILISTIC MANNER

FIG.3

| Dst | Next | Cost | Ant ID | Update Time | Pheromone | Status |
|---|---|---|---|---|---|---|
| 100 | 11 | 5 | 10 | 09:30:00 | 0.27 | ACTIVE |
| | 12 | 6 | 10 | 09:30:05 | 0.28 | ACTIVE |
| | 15 | 8 | 11 | 09:30:10 | 0.31 | ACTIVE |
| | 18 | 6 | 6 | 09:27:00 | 0.021 | INACTIVE |
| | 20 | 7 | 8 | 09:28:00 | 0.015 | INACTIVE |
| | 22 | 10 | 5 | 09:25:45 | 0.005 | INACTIVE |

NEXT NODE SELECTED BY EXPLORATION ANT

NEXT NODE HAVING HIGH PROBABILITY OF BEING SELECTED BY EXPLORATION ANT

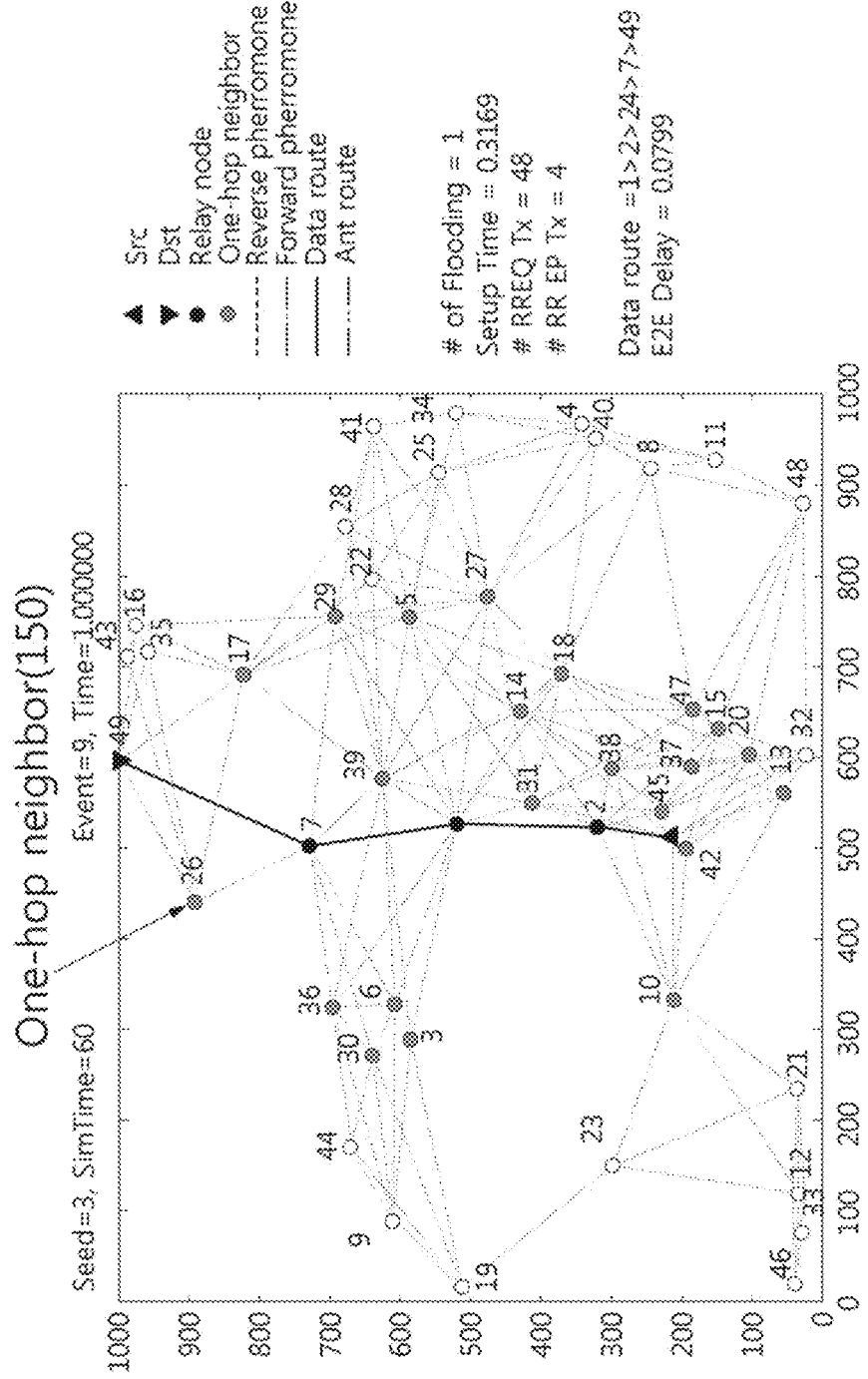

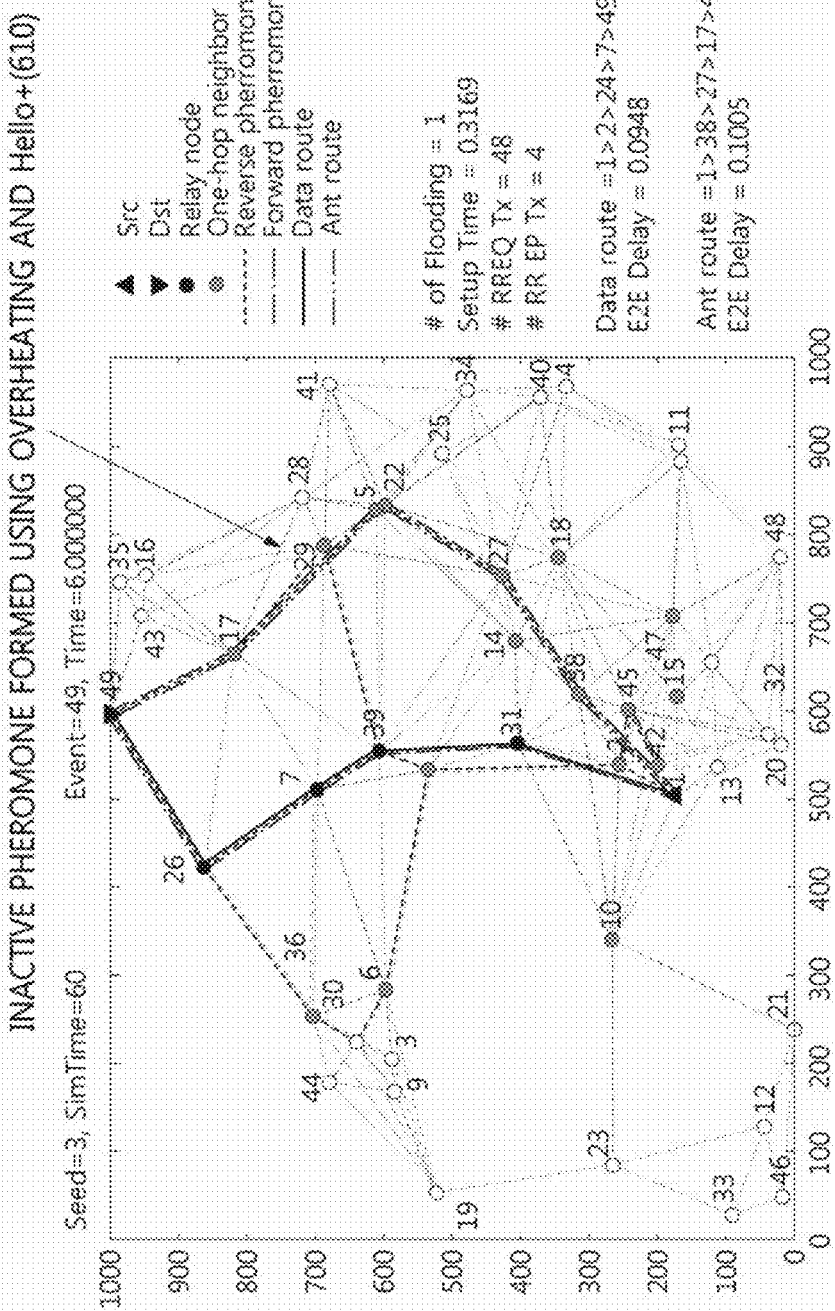

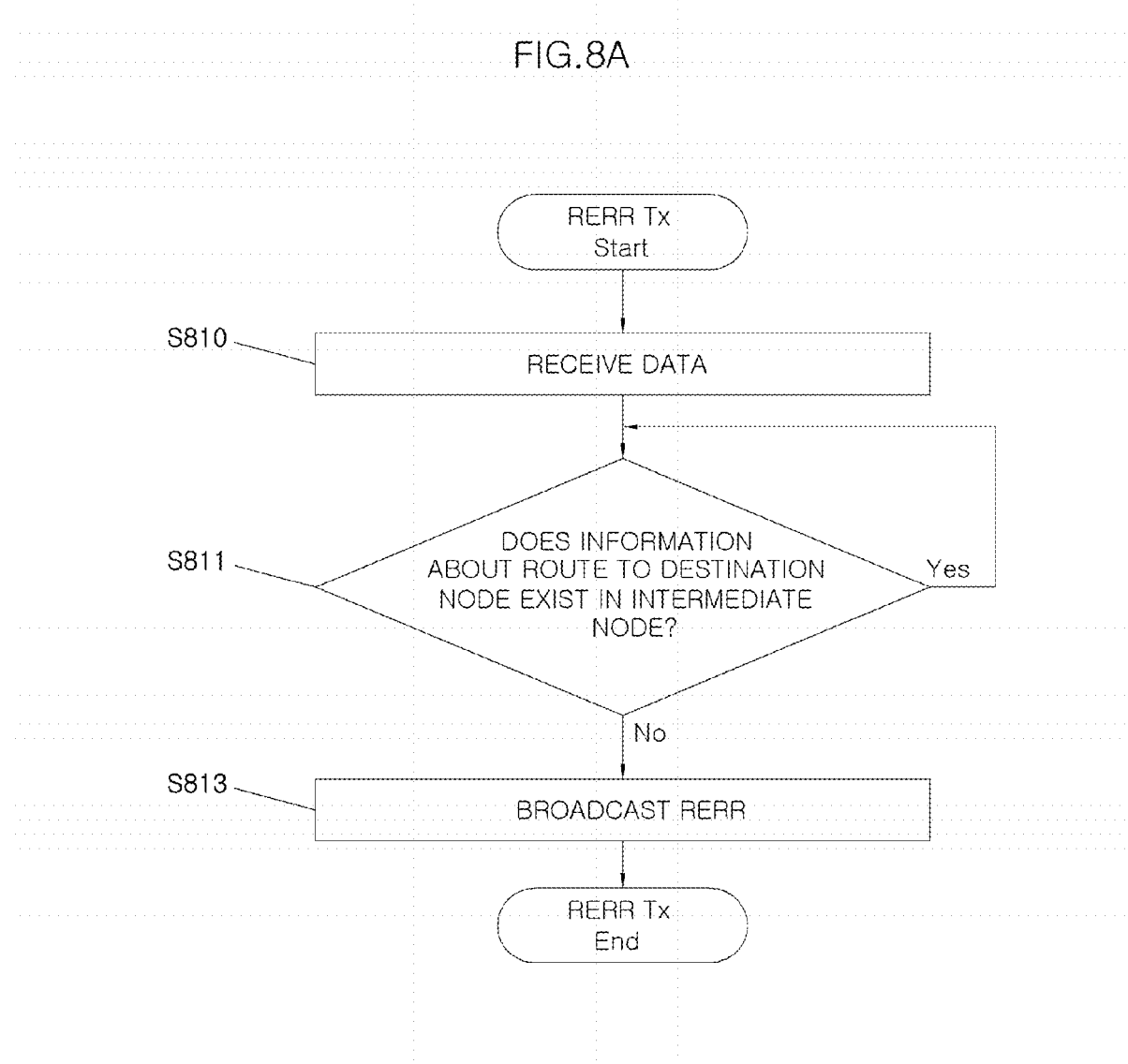

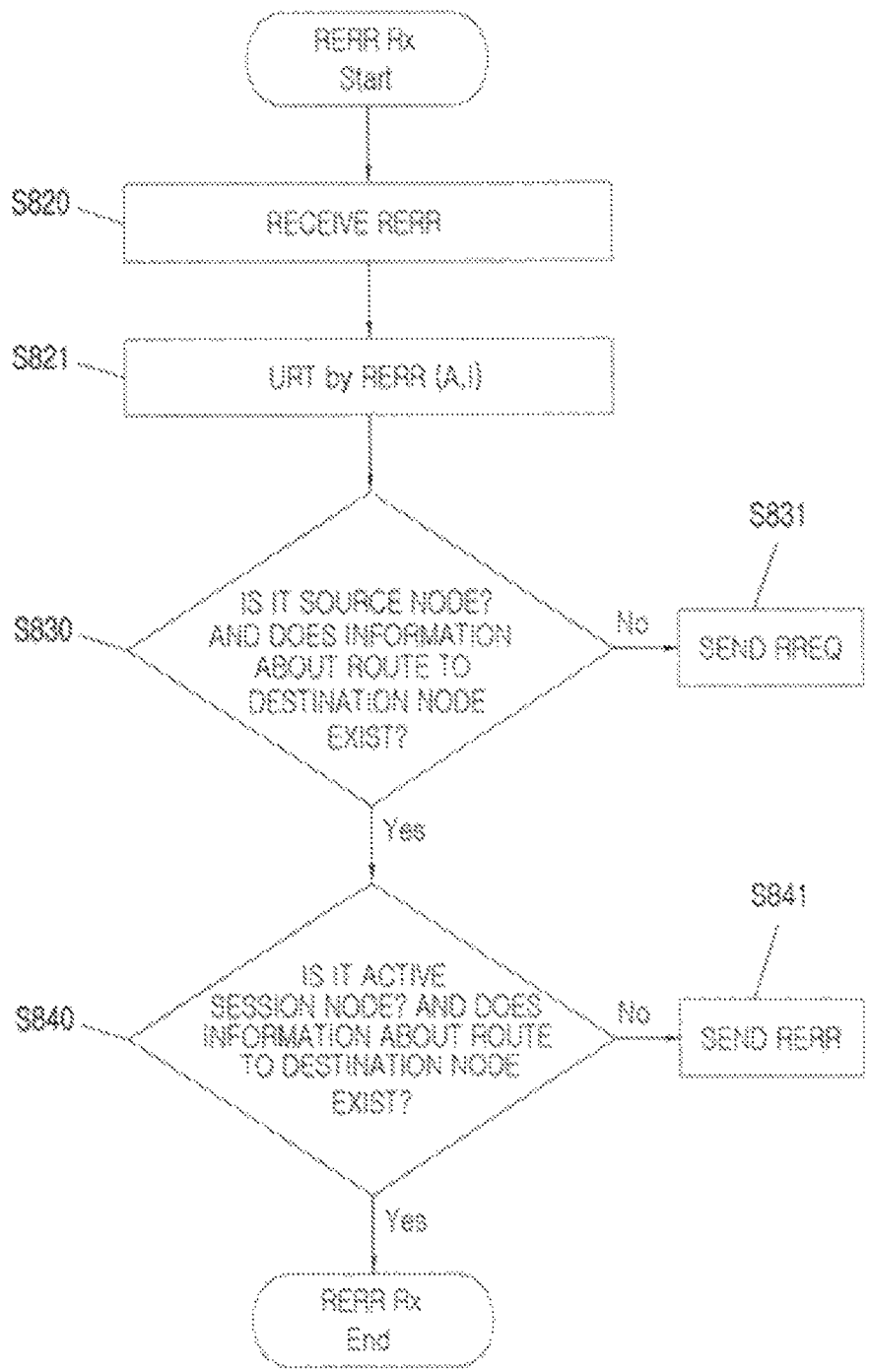

METHOD FOR PROVIDING BIO-INSPIRED ROUTING PROTOCOL USING OVERHEARING AND PROBABILISTIC PATH FINDING IN MOBILE AD HOC NETWORKS AND SYSTEM THEREOF

CROSS-REFERENCE TO RELATED APPLICATION

This application claims the benefit of priority to Korean Patent Application No. 10-2015-0129804 filed on Sep. 14, 2015, the entire contents of which are incorporated herein by reference.

BACKGROUND OF THE INVENTION

1. Technical Field

The present invention relates generally to routing protocol technology and, more particularly, to a method and system for providing bio-inspired routing protocols using overhearing and/or probabilistic path finding in a mobile ad hoc network.

2. Description of the Related Art

Existing mobile ad hoc routing protocols based on proactive/reactive methods periodically or a periodically generate a large number of control packets, thus incurring routing overhead and a delay in path finding. Also, in an existing routing algorithm, because the best path is selected in such a way that, intermediate nodes autonomously determine the nodes subsequent thereto, it is difficult to guarantee the end-to-end quality of service (QoS) performance required for actual transmission service.

Furthermore, in the case of multi-path routing protocols, load balancing problems may arise from the decreased overall capacity of networks, the exhaustion of resources of a specific terminal, or the like. In comparison with the existing mobile ad hoc routing algorithm, a bio-inspired routing algorithm has the following characteristics.

First, because ants, bees and the like can search for an optimized path in a dynamically changing environment in a dispersed and independent manner, a routing algorithm that takes inspiration from this is appropriate for autonomously maintaining optimal network status without administrative intervention in spite of various changes in the mobile network environment.

Second, in colonies of organisms, although the multiple entities have limited resources, they easily search for the best path using flexible adaptability. Therefore, when only limited resources are available in a large-scale network, it may be applied in order to reduce overhead and maximize routing performance.

Finally, because the bio-inspired, routing algorithm adapts to various changes in the external situation and thereby solves problems by itself, it is possible to quickly recover from unpredictable path failure and/or loss, which may occur during movement. Accordingly, bio-inspired routing protocols are being proposed.

A representative example of such a bio-inspired routing protocol is AntHocNet. AntHocNet has two features of ad hoc routing protocols, namely, reactive routing and proactive routing. First, when there is no information about a route to the destination, the process of setting up a route is performed based on reactive routing. Also, when link failure occurs, a local route repair process is performed and warning messages are sent based on the reactive routing. Meanwhile, a route maintenance process for maintaining and improving existing route information is performed based on proactive routing.

The AntHocNet basically follows a routing method based on distance vectors, but pheromones, acquired by processing the distance vectors in a probabilistic manner, may be used in place of the distance vectors. The use of pheromones is the main characteristic of the ant-based bio-inspired routing protocol. AntHocNet uses two kinds of pheromone information, that is, regular pheromones and virtual pheromones, and a routing table separately stores the two kinds of pheromones. The regular pheromone is defined as the inverse number of the cost of reaching a destination node, and may thus serve as a measure of the 'goodness' of the corresponding path.

Meanwhile, the virtual pheromone corresponds to another kind of information for estimating the goodness of a path, and may be acquired through calculation based on the goodness reported from neighboring nodes during a proactive route maintenance process.

The AntHocNet starts a reactive route setup process when a routing table contains no information about the destination to which data packets created in a source are to be delivered. To this end, a reactive forward ant packet is broadcast over a network. However, if an intermediate node that receives this packet has routing information about the corresponding destination, the intermediate node forwards the packet by unicast. In this case, the intermediate node determines the next node n to which the packet is to be sent in a probabilistic manner using the following Equation (1):

$$P_{in}^d = \frac{(\tau_{in}^d)^{\beta_1}}{\sum_{j \in N_i^d} (\tau_{ij}^d)^{\beta_1}}, \beta_1 \geq 1 \tag{1}$$

where $P_{in}^d$ denotes the probability of selecting the next node n in the path from the node i to the destination d, $\tau_{in}^d$ denotes the regular pheromone value for the path from the node i to the destination d via the next node n, $N_i^d$ denotes the set of neighboring nodes that may provide the path from the node i to the destination d, and $\beta_1$ denotes a weighted constant for controlling the probability value. As shown in Equation (1), the probability value is determined in proportion to the regular pheromone value $\tau_{in}^d$.

Conversely, if the intermediate node has no routing information about the corresponding destination, the intermediate node forwards the packet by broadcast. Here, in order to reduce flooding overhead, each node forwards only the first arrived packet, among the arrived reactive forward ant packets. The reactive forward ant packet is delivered while storing information about the nodes through which the reactive forward ant packet has passed en route to the destination. When the reactive forward ant packet reaches the destination, a reactive backward ant packet is created at the destination.

The reactive backward ant packet is created such that information about the path along which the reactive forward ant packet has traveled is copied into the header thereof, whereby the reactive backward ant packet is sent to the source by backtracking. In this process, information about the quality of each link in the path is collected, and based on the information about the quality, the intermediate nodes and the source node calculate the pheromone value for the destination and update their routing tables.

Also, after the first path is established, the AntHocNet starts a proactive route maintenance process. As a result, routing information is periodically updated and/or improved. The proactive route maintenance process includes two subprocesses, namely, pheromone diffusion and proactive ant sampling. First among these, pheromone diffusion serves to diffuse pheromone information, and is similar to a pheromone diffusion phenomenon in nature. To this end, all nodes on the network periodically broadcast their best pheromone information (which is the greatest value of the pheromone values for each destination in the routing table) regardless of the presence of a communication session. The best pheromone information is delivered using a Hello message, and all the nodes asynchronously deliver the message at a Hello interval. The neighboring node, having received the Hello message, updates its pheromone value by combining the known cost information with the received best pheromone information using the following Equation (2):

$$\kappa_{ji}^d = ((v_i^d)^{-1} + c_j^t)^{-1} \quad (2)$$

where $v_i^d$ denotes the best pheromone information for the best path from the node i to the destination d, and $c_j^t$ denotes the locally maintained cost value and represents the cost of sending a packet from the node j to the node i.

As shown in Equation (2), the value acquired by adding the cost value $c_j^t$ to the inverse number of the best pheromone value $v_i^d$, which is received from the neighboring node i, becomes the total cost value for the path from the node j to the destination d via the node i, and the inverse number thereof becomes a new pheromone value $\kappa_{ji}^d$. Each node diffuses the updated pheromone value at preset intervals. Here, the pheromone value acquired through the pheromone diffusion is called a virtual pheromone, and it is managed separately.

In comparison with the virtual pheromone, a pheromone acquired by path finding using ant packets is called a regular pheromone. The virtual pheromone is used only to support proactive ant sampling. In other words, the virtual pheromone is used only when a proactive forward ant packet is forwarded, and afterwards the regular pheromone is acquired through a proactive backward ant packet.

Proactive ant sampling is the process by which a proactive forward ant packet is created and path sampling is performed using the proactive forward ant packet, whereby the regular pheromone information is updated. To this end, all the source nodes periodically create proactive forward ant packets and send them to a destination while a communication session is maintained. Here, the transmission interval of the proactive forward ant packets is set to the Hello interval. The proactive forward ant packets are forwarded in a probabilistic manner, and the probability value for selecting the next hop is determined in consideration of both the regular pheromone and the virtual pheromone. The proactive forward ant packet selects the next node n using the probability value acquired using the following Equation (3):

$$P_{in}^d = \frac{[\max(\tau_{in}^d, \omega_{in}^d)]^{\beta_2}}{\sum_{j \in N_i^d} [\max(\tau_{ij}^d, \omega_{ij}^d)]^{\beta_2}}, \beta_2 \geq 1 \quad (3)$$

where $P_{in}^d$, $\tau_{in}^d$, and $N_i^d$ are the same as the values defined above, $\omega_{in}^d$ denotes the virtual pheromone value for the path from the node i to the destination d via the next node n, and $\beta_2$ denotes a weighted constant for controlling the probability value. As shown in Equation (3), the greater value, among the regular pheromone $\tau_{in}^d$ and the virtual pheromone $\omega_{in}^d$, is used, and the probability value that is proportional to the greater value is calculated.

When the proactive forward ant packet reaches the destination, it is converted into a proactive backward ant packet and backtracks to the source node while leaving only a regular pheromone. In other words, the proactive ant packet tracks the virtual pheromone, but when it reaches the destination, the pheromone information is converted into the regular pheromone. Consequently, a new path is recommended through pheromone diffusion, and a proactive ant packet checks the new path.

Meanwhile, a data packet is forwarded by a hop-by-hop transmission method, in which the next node is determined based on a local pheromone value, in which case only a regular pheromone is used. When a data packet is transmitted, the probability of forwarding the packet to the next node n is calculated using the following Equation (4):

$$P_{nd} = \frac{(\tau_{in}^d)^{\beta_3}}{\sum_{j \in N_i^d} (\tau_{ij}^d)^{\beta_3}}, \beta_3 \geq 1 \quad (4)$$

where $\beta_3$ denotes a weighted constant for controlling the probability value.

Meanwhile, pheromone diffusion and proactive ant sampling in the AntHocNet may cause significant overhead. Such overhead may be caused because all the nodes on the network must periodically send a Hello message which includes their best pheromone information, and must periodically transmit proactive ant packets in both directions. Here, the periodic transmission of control packets may increase overhead and thus decrease the efficiency of transmission of data packets.

Also, the pheromone diffusion process of the AntHocNet is based on Destination-Sequenced Distance Vector (DSDV) routing, but DSDV is known to have a low speed when tracking the change of topology in a high-mobility environment. That is, because the pheromone diffusion process of the AntHocNet may have decreased convergence speed in a high-mobility environment, it is disadvantageous in that correct routing information for a destination may not be provided.

Furthermore, in the proactive route maintenance process of the AntHocNet, a stagnation problem, in which the same path is repeatedly found because the process depends mainly on a regular pheromone value if there is no significant change in a virtual pheromone, may occur. The stagnation problem signifies the unnecessary creation of proactive ant packets, and may increase overhead. Also, it is highly probable that an alternative path to be used in the event of link failure cannot be secured in advance.

SUMMARY OF THE INVENTION

Accordingly, the present invention has been made keeping in mind the above problems occurring in the conventional art, and an object of the present invention is to provide a method and system for providing a bio-inspired routing protocol that may provide correct routing information for a destination.

Another object of the present invention is to provide a method and system for providing a bio-inspired routing protocol that may prevent a stagnation problem, in which the same path is repeatedly found because path finding depends mainly on regular pheromone values.

A further object of the present invention is to provide a method and system for providing a bio-inspired routing protocol in which the unnecessary creation of proactive ant packets and the increase of overhead, which may arise from the stagnation problem, may be prevented, and in which the probability with which an alternative path to be used in the event of link failure cannot be secured in advance may be decreased.

In order to accomplish the above object, the present invention provides a method for providing a bio-inspired routing protocol capable of providing correct information about a route to a destination.

The method for providing a bio-inspired routing protocol using overhearing and probabilistic path finding in a mobile ad hoc network, which includes multiple nodes, may include (a) transmitting, by a source node and a destination node, a data packet and an exploitation ant packet along a single route therebetween in both directions, the source node and the destination node being selected from among the multiple nodes; (b) overhearing, by remaining nodes, the data packet and the exploitation ant packet, the remaining nodes being acquired by excluding nodes on the single route from the multiple nodes; (c) determining one-hop neighbors, among the remaining nodes, through the overhearing, and determining a one-hop coverage range formed by a communication range of the one-hop neighbors; (d) updating, by the one-hop neighbors, pheromone information through the overhearing, and sending, by the one-hop neighbors, best pheromone information for traveling to the destination node based on the updated pheromone information; and (e) setting an alternative route in such a way that the source node creates an exploration ant packet based on the updated pheromone information and performs alternative route sampling through probabilistic path finding.

Here, the routing protocol may be configured to include routing table information management for managing information about multiple routes; route setup for establishing a route; overhearing for determining the one-hop neighbors of the route from the source node to the destination node; pheromone diffusion for diffusing the pheromone information near the route from the source node to the destination node using the overhearing and transmission and reception of a specific message by the one-hop neighbors; route management for maintaining the established route; data forwarding for selecting a next hop in a probabilistic manner based on the pheromone information; and route recovery for informing a preceding node that there is no transmission route when there is no route along which a data packet is to be transmitted.

Also, the routing table information management may be configured to additionally manage an update time, pheromone information, and status information.

Also, the route management may be configured to perform route sampling in a probabilistic manner in order to prepare for link failure.

Also, the alternative route sampling for searching for another route from the source node to the destination node in a probabilistic manner may be performed within the one-hop coverage range.

Also, the pheromone information may be defined as the following equation $$\tau_{ij}^d = (1/c_{ij}^d)^\alpha (1/t_{ij}^d)^\beta$$

where $\tau_{ij}^d$ denotes a pheromone for a route from the node i to the destination d via the next node j, c denotes cost for the corresponding route, t denotes a time elapsed after corresponding information is updated, and $\alpha$ and $\beta$ denote weighted constants.

Also, the status information may be set as an active status when the status information is acquired through the data packet, the exploitation ant packet or the exploration ant packet, but the status information is set as an inactive status when the status information is acquired through the overhearing or a message that includes the exploration ant packet.

Also, the active status may be switched to the inactive status when a preset timer expires, the inactive status may be deleted when a preset second timer expires, the active status may be used only to forward the data, packet and the exploitation ant packet, and the inactive status may be used only to forward the exploration ant packet.

Also, the source node may create a forward exploitation ant packet and transmit the forward exploitation ant packet to the destination node, the destination node may create a backward exploitation ant packet corresponding to the forward exploitation ant packet and transmit the backward exploitation ant packet to the source node, and nodes on a route along which the forward exploitation ant packet and the backward exploitation ant packet are transmitted may update the routing table information.

Also, in order to secure the alternative route after the single route is established, the source node may be configured to create a forward exploration ant packet, to select a node corresponding to a next hop in a probabilistic manner based on the pheromone information among the routing table information having an inactive status, and to transmit the forward exploration ant packet; and the destination node may be configured to create a backward exploration ant packet corresponding to the forward exploration ant packet and to transmit the backward exploration ant packet, wherein the backward exploration ant packet may travel to the source node backward along a route along which the forward exploration ant packet traveled.

Also, the route recovery may be configured to periodically perform the alternative route sampling using a multi-path routing method.

Meanwhile, another embodiment of the present invention provides a system for providing a bio-inspired routing protocol using overhearing and probabilistic path finding in a mobile ad hoc network, which includes multiple nodes, the system being configured such that a source node and a destination node, which are selected from among the multiple nodes and form a single route therebetween, transmit a data packet and an exploitation ant packet in both directions along the single route; remaining nodes, acquired by excluding nodes on the single route from the multiple nodes, overhear the data packet and the exploitation ant packet; one-hop neighbors are selected from among the remaining nodes through the overhearing; and a one-hop coverage range is determined by a communication range of the one-hop neighbors, wherein the one-hop neighbors update pheromone information through the overhearing and send best pheromone information for traveling to the destination node based on the updated pheromone information, and the source node creates an exploration ant packet based on the updated pheromone information and performs alternative route sampling through probabilistic path finding, whereby an alternative route is established.

BRIEF DESCRIPTION OF THE DRAWINGS

The above and other objects, features and advantages of the present invention will be more clearly understood from the following detailed description taken in conjunction with the accompanying drawings, in which:

FIG. 3 is an example of routing table information according to an embodiment of the present invention;

FIG. 5 is an example of the process of determining one-hop neighbors through overhearing according to an embodiment of the present invention;

FIG. 6 is an example of an inactive pheromone formed using overhearing and a Hello+ message according to an embodiment of the present invention;

FIG. 8A is a flowchart of the process of transmitting a Route Error (RERR) packet, and FIG. 8B is a flowchart of the process of receiving an RERR packet according to an embodiment of the present invention;

DESCRIPTION OF THE PREFERRED EMBODIMENTS

Figure 1:
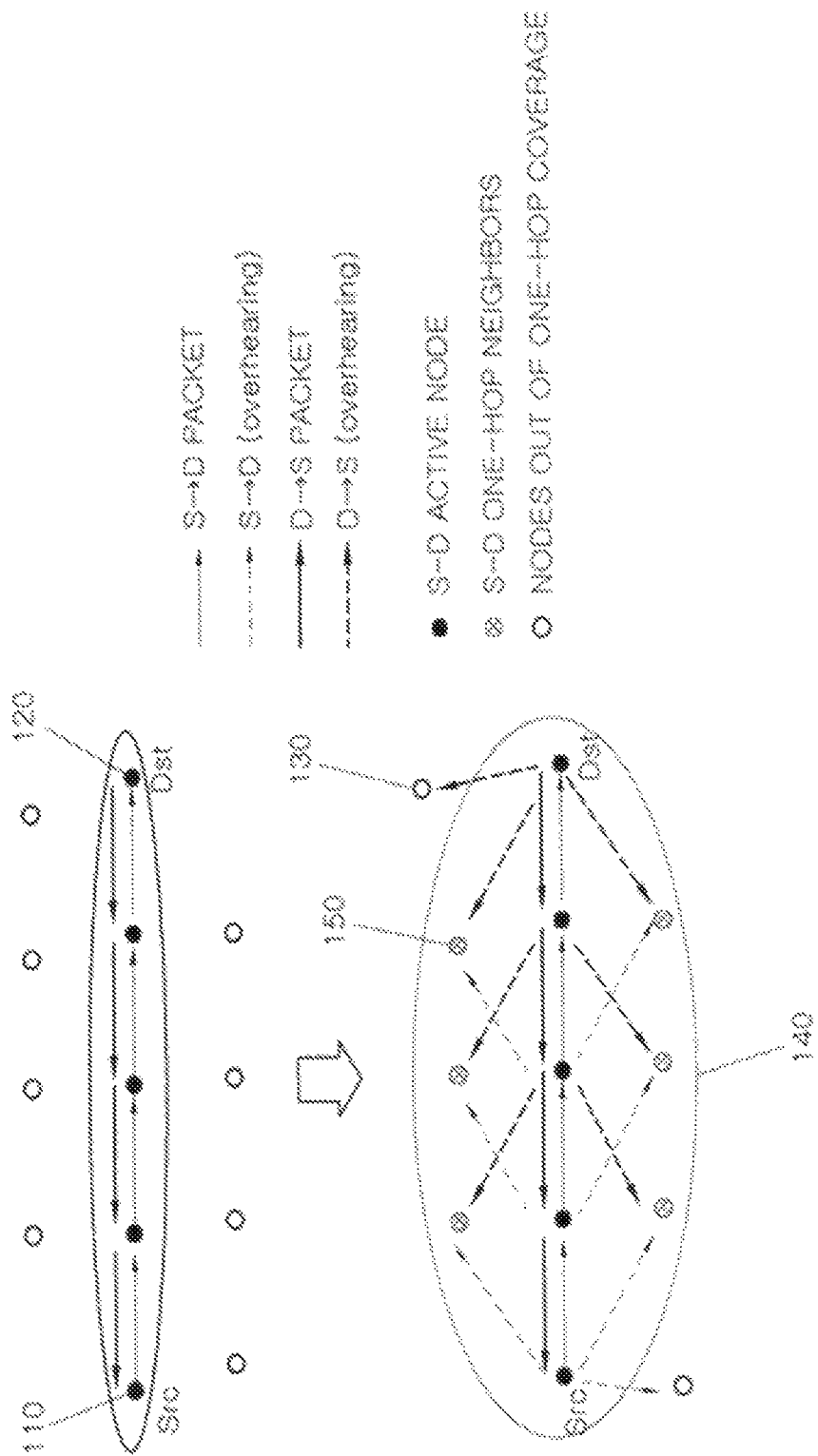
FIG. 1 is a concept diagram that shows one-hop neighbors and one-hop coverage, determined through overhearing.

The present invention may be variously changed, and may have various embodiments, and specific embodiments will be described in detail below with reference to the attached drawings. However, it should be understood that those embodiments are not intended to limit the present invention to specific disclosure forms and that they include all changes, equivalents or modifications included in the spirit and scope of the present invention.

The same reference numerals are used to designate the same or similar elements throughout the drawings.

Terms such as "first", "second", and the like may be used to describe various elements, but the elements should not be limited by the terms. The terms are used only to distinguish one element from another element.

For example, without departing from the scope of the present invention, the first element may be referred to as the second element, and similarly, the second element may be referred to as the first element. The term "and/or" may include a combination of multiple related elements or any one of multiple related elements.

Unless differently defined, all terms used here including technical or scientific terms have the same meanings as the terms generally understood by those skilled in the art to which the present invention pertains.

The terms identical to those defined in generally used dictionaries should be interpreted as having meanings identical to the contextual meanings in the related art, and are not to be interpreted as having ideal or excessively formal meanings unless they are definitely defined in the present specification.

Hereinafter, a method and system for providing a bio-inspired routing protocol using overhearing and probabilistic path finding in a mobile ad hoc network according to an embodiment of the present invention will be described in detail with reference to the accompanying drawings.

FIG. 1 is a concept diagram that shows one-hop neighbors and one-hop coverage determined through overhearing. The bio-inspired routing protocol according to an embodiment of the present invention basically uses broadcast features of wireless media. That is, because signals transmitted via wireless media are always broadcast, the nodes that fall within a range that the signals can reach may decode the received signals. Therefore, even if the signals do not correspond to data intended to reach the nodes, the nodes may overhear the signals of the neighboring nodes. Here, because neighboring nodes merely overhear the packets that must be transmitted, overhearing does not incur additional overhead. Therefore, if information acquired through overhearing can be used for routing, supplementary information may be obtained without additional overhead.

Also, in the routing method according to an embodiment of the present invention, each node may overhear packets that are sent or received between a source node 110 and a destination node 120, such as Route Reply (RREP) packets, exploitation ant packets, data packets, ACK packets or the like. Here, the nodes that overhear packets transmitted in both directions between a source and a destination become one-hop neighbors 150 of the route from the source to destination, and the area within which the one-hop neighbors fall is defined as one-hop coverage of the route from the source to destination. Also, there are nodes 130 outside of the one-hop coverage range.

Meanwhile, each node on a network may detect a source-to-destination route, the one-hop neighbors of which include the node, through overhearing. Here, overhearing may be understood as a phenomenon in which pheromones, formed on the route from the source to destination, diffuse. FIG. 1 shows one-hop neighbors 150 and one-hop coverage 140 determined through overhearing of the packets transmitted in both directions between a source and a destination.

Also, a routing protocol according to an embodiment of the present invention is configured as the following seven processes.

① Routing table management: Information about multiple routes is managed, and update time, pheromones and status information (active or inactive) are managed in addition to existing routing table information. These are shown in FIG. 3. A detailed description will be made later.

Figure 4:
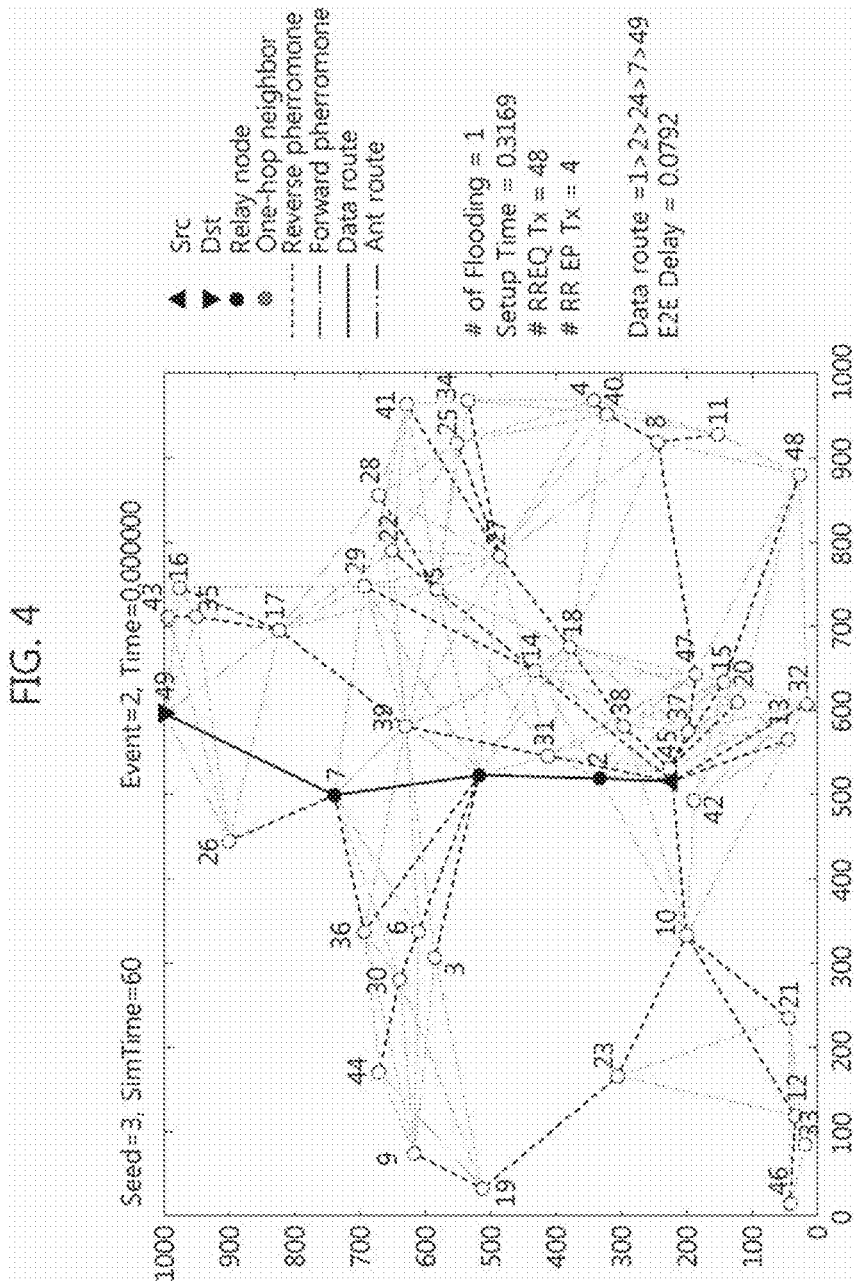
FIG. 4 is an example of a route setup process according to an embodiment of the present invention.

② Route setup: This is based on a reactive method, and an embodiment of the present invention uses the same method as an Ad hoc On-demand Distance Vector (AODV) in order to quickly establish a route. This is shown in FIG. 4. A detailed description will be made later.

③ Overhearing: One-hop neighbors of the route from a source to destination are determined. This is shown in FIG. 5. A detailed description will be made later.

④ Pheromone diffusion: Pheromones are diffused using overhearing and by which one-hop neighbors send and receive a Hello+ message. This is shown in FIG. 6. A detailed description will be made later.

⑤ Route maintenance: This is based on a proactive method. In this process, an exploitation ant packet maintains the best route in order to enable the fast delivery of data packets. Also, an exploration ant packet performs route sampling in a probabilistic manner and thereby prepares for link failure. In the routing protocol according to an embodiment of the present invention, the maintenance of the best route is performed by the exploitation ant packet, and alternative route sampling is performed by the exploration ant packet.

The exploitation ant packet aims at maintaining the best route, currently used to transmit data, and is periodically transmitted from a source node after the route is established. A forward exploitation ant packet, created in a source node, is transmitted to a destination by unicast in such a way that the next hop having the lowest cost is selected. In the destination node, a backward exploitation packet corresponding to the forward exploitation ant packet is created. The backward exploitation ant packet travels to the source node along the best route. Through this process, the nodes on the route along which the forward and backward exploitation ant packets travel update their routing table information. Here, if a bidirectional data packet and an ACK packet can also function as an exploitation ant packet through piggybacking, the transmission of an exploitation ant packet may be skipped.

An exploration ant packet is transmitted in order to secure an alternative route that can be used when link failure occurs. The exploration ant packet is periodically transmitted from a source node after a route is established. Here, the next hop is selected in a probabilistic manner based on a pheromone value, among routing information having an inactive status, and the exploration ant packet is transmitted via unicast. Here, the probability value used to select the next hop is calculated using the following Equation (5):

$$P_{in}^d = \frac{\tau_{in}^d}{\sum_{j \in N_i^d} \tau_{ij}^d} = \frac{(1/c_{in}^d)^\alpha (1/t_{in}^d)^\beta}{\sum_{j \in N_i^d} (1/c_{ij}^d)^\alpha (1/t_{ij}^d)^\beta} \quad (5)$$

where $P_{in}^d$ denotes the probability of selecting the next node n on a route from the node i to the destination d, $\tau_{in}^d$ denotes the pheromone value for the route from the node i to the destination d via the next node n, and $N_i^d$ denotes a set of neighboring nodes that may provide a route from the node i to the destination d. As defined in Equation (5), the pheromone value $\tau_{in}^d$ is inversely proportional to the cost value $c_{in}^d$ and the elapsed time $t_{in}^d$, and is controlled by the weighted constants α and β.

The forward exploration ant packet stores the route along which it travels in the header thereof and reaches the destination node, and in the destination node, a backward exploration ant packet corresponding to the forward exploration ant packet is created. The backward exploration ant packet travels backward to the source node along the route along which the forward exploration packet traveled. Here, the forward and backward exploration ant packets update the routing table information for the route along which they traveled. The description of the seven processes of the routing protocol continues below.

⑥ Data forwarding: When a data packet is transmitted, the next hop is determined in a probabilistic manner based on a pheromone value in consideration of load balancing. The next hop to which a data packet is to be transmitted is determined using the following probability value:

$$P_{nd} = \frac{(\tau_{in}^d)^\gamma}{\sum_{j \in N_i^d} (\tau_{ij}^d)^\gamma}, \gamma \geq 1 \quad (6)$$

where $N_i^d$ denotes neighboring nodes having routing information, the status of which is active, $\tau_{in}^d$ denotes a pheromone value for the route from the node i to the destination d via the next node n, $\tau_{ij}^d$ denotes a pheromone value for the route from the node i to the destination d via the next node j, and γ denotes a weighted constant and generally uses a large value in order to forward the data packet to the best route.

The node that receives the data packet without error updates the update time information in the routing table. Also, if information about the cost can be attached to the data packet using piggybacking, the cost and the pheromone value may also be updated in the routing table.

⑦ Route recovery: If there is no route to which a data packet is to be transmitted, the corresponding node transmits a Route Error (RERR) packet to the preceding node so as to announce that the transmission route has disappeared. In this case, a general route recovery process is applied. First, link failure can be detected when the Media Access Control (MAC) layer reports the failure of the transmission of a data packet or a control packet, or when the periodic reception of a Hello message fails. If there is no information about the next hop to be used to transmit a packet to the destination node because link failure occurs when the data packet is sent from a certain node, the node deletes the corresponding routing table information, creates an RERR packet, and transmits it to neighboring nodes. The node that receives the RERR packet updates the routing table information about the link on which failure occurs. If the updated routing table information of the node includes no information about the next hop necessary to reach the destination but the node has data to be sent to the corresponding destination, the node creates the RERR packet again and propagates it. Through this process, link failure is announced to the related nodes until the source node receives the RERR packet. When the source node receives the RERR packet, if there is no information about the next hop to which the packet is to be transmitted, the route setup process is started again.

Because a routing protocol according to an embodiment of the present invention basically uses a multi-path routing method and periodically performs alternative route sampling, no consideration need be given to a local repair process.

Figure 2A:
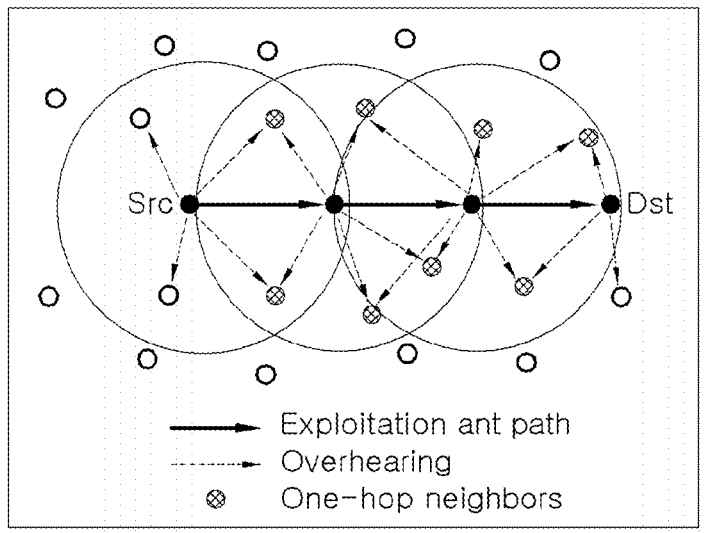
FIGS. 2A to 2D are concept diagrams that show the process of detecting network topology according to an embodiment of the present invention.

FIGS. 2A to 2D are concept diagrams that show the process of detecting network topology according to an embodiment of the present invention. In FIG. 2A, when the fastest route between a source node and a destination node is established through the route setup process, a data packet and an exploitation ant packet are transmitted in both directions along this route. These bidirectional packets, transmitted along the source-to-destination route, may be overheard by neighboring nodes, and the nodes that overhear these packets may detect that they are one-hop neighbors of the source-to-destination route.

Figure 2B:
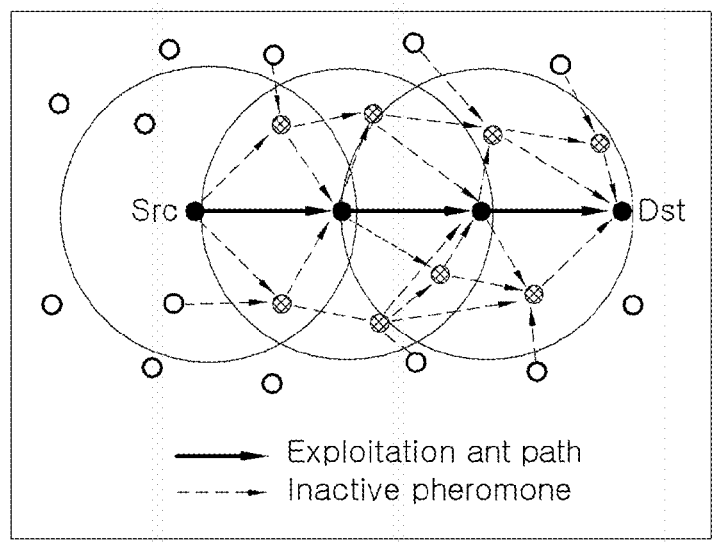

Referring to FIG. 2B, the one-hop neighbors update pheromone information through overhearing and periodically broadcast the best pheromone information for the route to the destination using a Hello+ message based on the updated pheromone information. The neighboring nodes, having received the Hello+ message, update the pheromone for the corresponding destination. Here, the pheromone formed through this process is defined as an inactive pheromone.

Figure 2C:
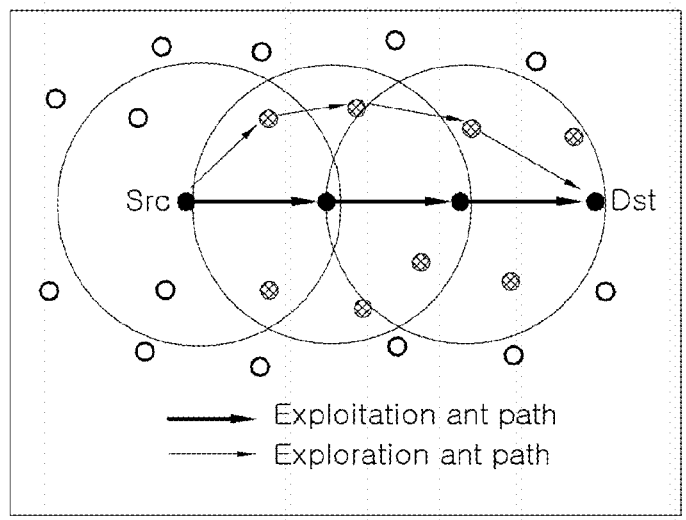
Figure 2D:
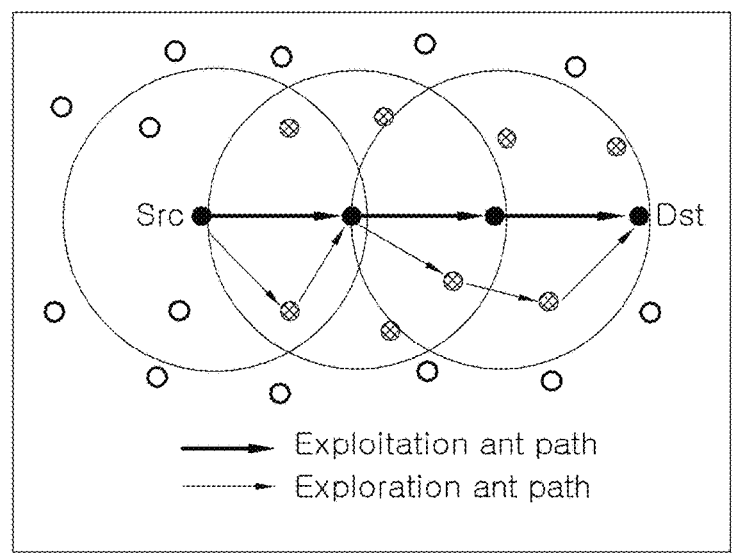

Subsequently, referring to FIG. 2C and FIG. 2D, the source node 110 creates an exploration ant packet, and the exploration ant packet samples a source-to-destination route in a probabilistic manner within a one-hop coverage range based on the inactive pheromone. This ant exploration process is periodically triggered so as to provide various alternative routes near the source-to-destination route along which data are being transmitted.

FIG. 3 is an example of routing table information according to an embodiment of the present invention. FIG. 3 shows routing table information for the destination 100, which is managed in a certain node. The routing table information includes the following information.

Cost: The measured cost is immediately recorded without being accumulated. Various values, such as the number of hops, a delay value, an Expected Transmission Time (ETT), an Expected Transmission Count (ETX), a Medium Time Metric (MTM), a Received Signal Strength (RSS), a Signal-to-Interference-plus-Noise Ratio (SINR), a Bit Error Rate (BER), a bandwidth and the like, may be used as the cost information.

Ant ID: The values in the routing table are updated if the Ant ID is greater than a previously stored Ant ID. Also, if the Ant ID is the same as the previously stored Ant ID, the values in the routing table are updated only when the cost is lower than the stored cost or when the packet arrives via a different route. If the Ant ID is less than the previously stored Ant ID, the values in the routing table are not updated.

Update Time: The time at which the corresponding routing information is recorded is stored.

Pheromone: This denotes information about the measure of the goodness of the next hop. The shorter the elapsed time, the less the effect of mobility. Therefore, the pheromone value is inversely proportional to the cost c and the elapsed time t. Here, the elapsed time t is defined as 'Current Time-Update Time'. The pheromone information for the route from the source node i to the destination node d via the intermediate node j is defined as the following Equation (7):

$$\tau_{ij}^d = (1/c_{ij}^d)^\alpha (1/t_{ij}^d)^\beta \quad (7)$$

where $\alpha$ and $\beta$ denote weighted constants.

Status: information acquired through data packets or ant packets is set to an active status, and information acquired through overhearing and Hello+ messages is set to an inactive status. The active status is switched to an inactive status when the ROUTE_TIMEOUT timer expires, and information having an inactive status is deleted when the ROUTE_DELETE timer expires. Information having an active status is used only to forward data packets and exploitation ant packets, and routing information having an inactive status is used only to forward exploration ant packets. That is, routing information on the source-to-destination route, extracted by the exploration ant packet, takes on an active status and is used to transmit data.

FIG. 4 is an example of a route setup process according to an embodiment of the present invention. Referring to FIG. 4, the route setup process is started when a node has a data packet to be transmitted but has no routing information about the destination node. The basically proposed routing protocol uses a flooding-based method, as in AODV, in order to quickly establish a route. In particular, FIG. 4 shows the route setup process according to an embodiment of the present invention. This process is based on a reactive method, and if a route to the destination node 120 via the intermediate node 430 is not found after flooding, a Route Request (RREQ) timeout occurs and the process is repeated again.

FIG. 5 shows the process in which a one-hop neighbor is determined through overhearing according to an embodiment of the present invention. Referring to FIG. 5, all the nodes on the network may overhear a packet, the destination of which is not the node itself. To this end, each of the nodes analyzes a packet by sending it to a higher layer even if the destination address of the layer 2 is not the address thereof. In the routing protocol according to an embodiment of the present invention, the packets that can be overheard are Route Reply (RREP) packets, data packets, ACK packets, forward exploitation ant packets, and backward exploitation ant packets.

A one-hop neighbor may be determined through overhearing. Specifically, if a node receives both the packets transmitted in both directions between a source and a destination within a certain time period, the node is set as a one-hop neighbor. Here, the pair of packets transmitted in both directions may be a pair comprising an RREP packet and a data packet, a pair comprising a data packet and an ACK packet (when an ACK exists), and a pair comprising a forward exploitation ant packet and a backward exploitation ant packet (when an ACK does not exist). The nodes that overheard packets calculate and store information about the cost of reaching the destination node by analyzing the overheard packets. The newly updated cost value is as follows:

$$c_{ij}^d = c_j^d + c_i^j \quad (8)$$

That is, the total cost for the route from the source node i to the destination node d via the intermediate node j is determined by adding the cost required to travel from the node j to the destination node d and the cost required to travel from the source node i to the intermediate node j. Particularly, FIG. 5 shows the one-hop neighbor formed near the route from the source to destination in the proposed routing protocol.

FIG. 6 is an example of an inactive pheromone 610 formed through overhearing and a Hello+ message according to an embodiment of the present invention. Referring to FIG. 6, for pheromone diffusion, one-hop neighbor periodically and asynchronously broadcast Hello+ messages. The Hello+ message is created such that the best pheromone information for the route to the destination node is added to a basic Hello message that is intended to announce the presence of a node. The neighboring nodes, having received the Hello+ message broadcast from the one-hop neighbors, update the information about the cost of reaching the destination node by calculating it using $c_{ij}^d = c_j^d + c_i^j$ based on the received information. The pheromone diffused through this process is regarded as an inactive pheromone 160. Particularly, FIG. 6 shows inactive pheromone information formed through overhearing and by sending and receiving the Hello+ message in the routing method according to an embodiment of the present invention.

Figure 7A:
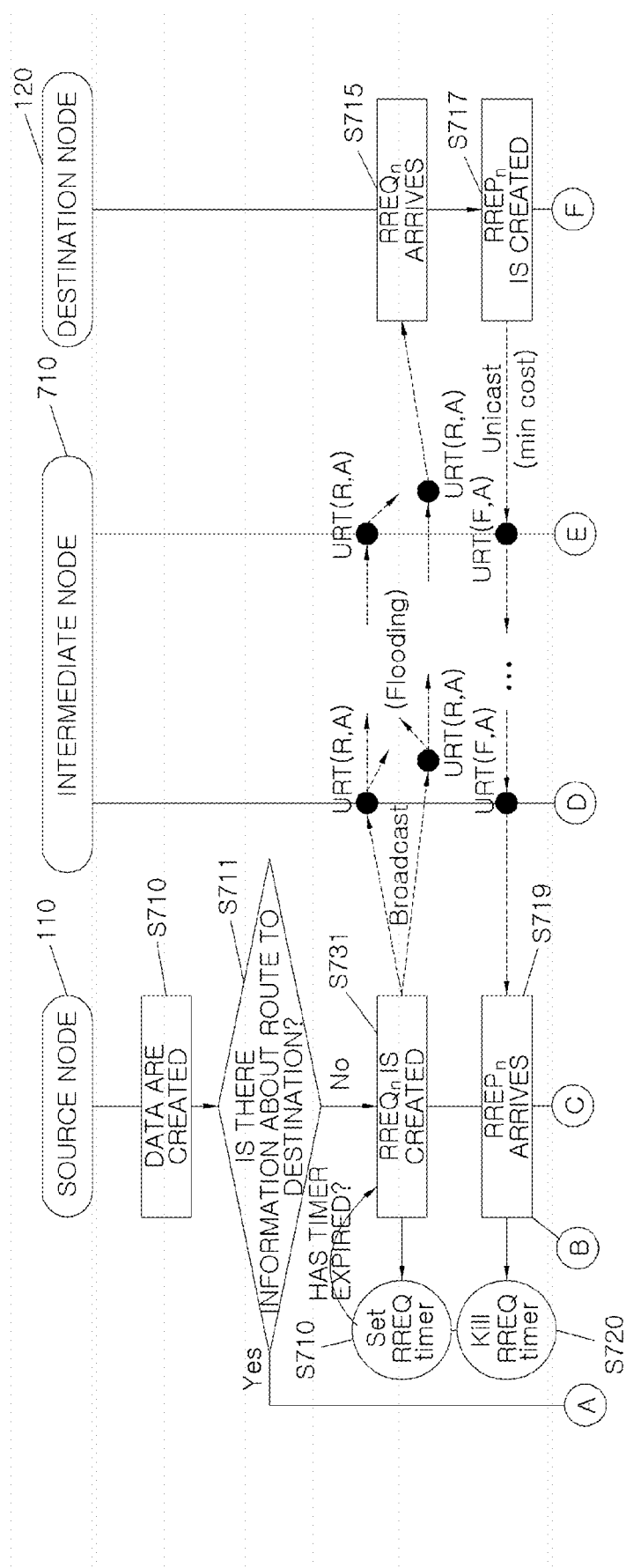
FIGS. 7A to 7C are flowcharts that show the procedures of a routing protocol according to an embodiment of the present invention.
Figure 7B:
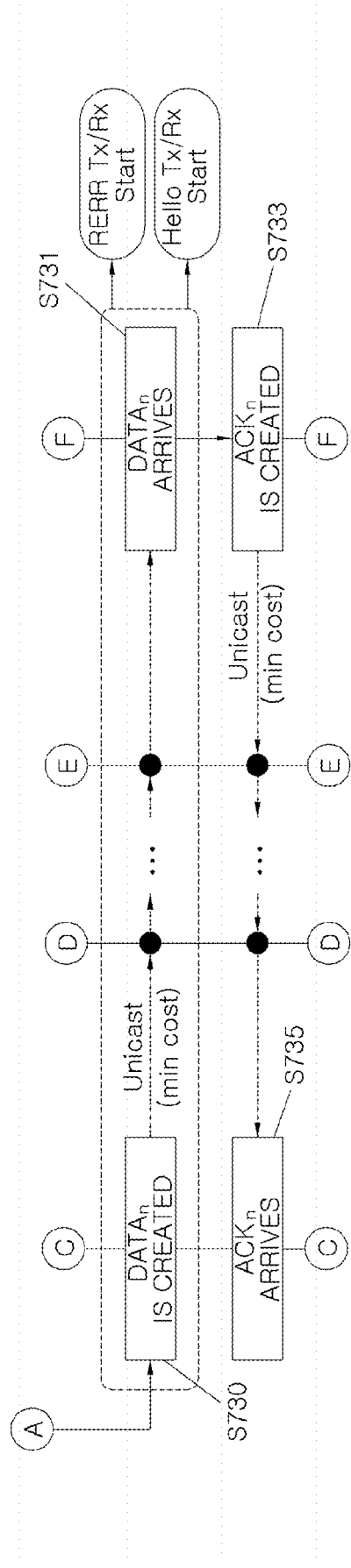
Figure 7C:
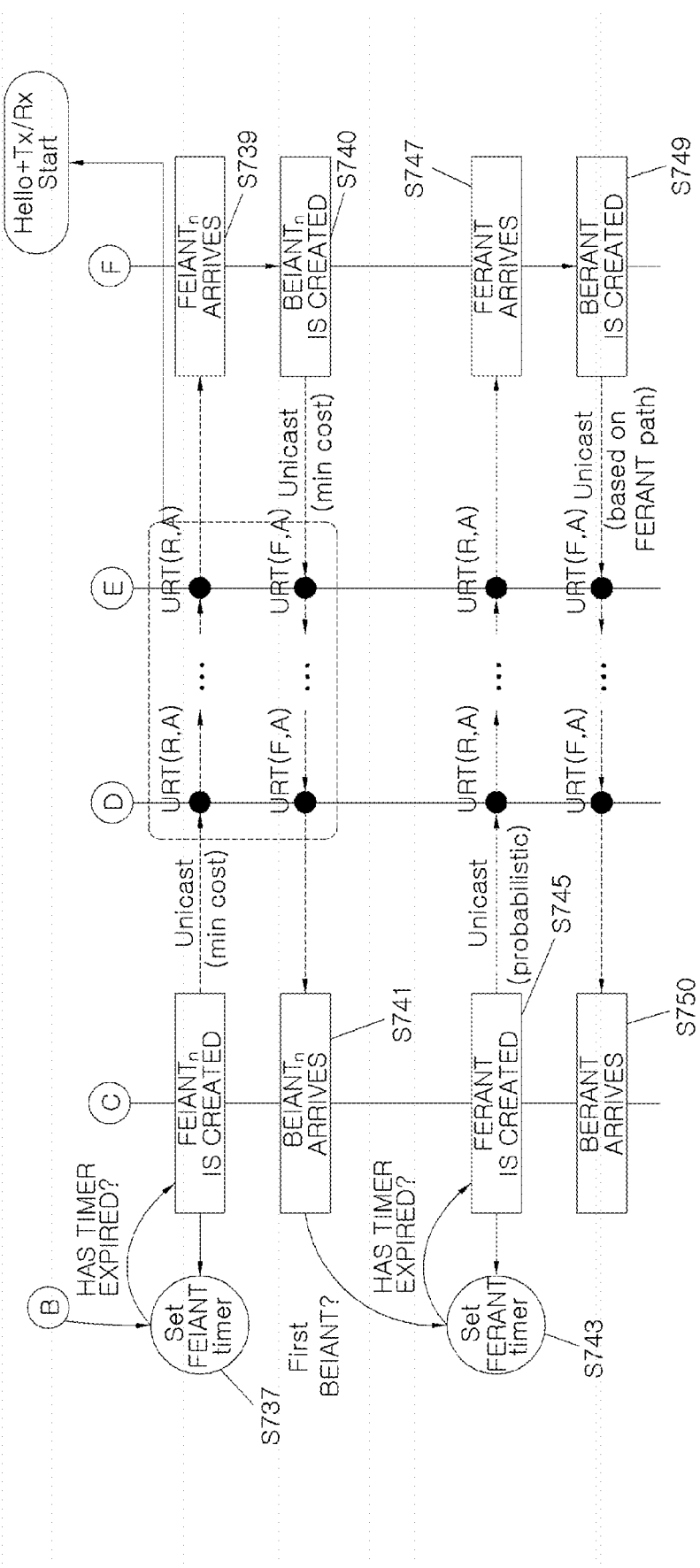

FIGS. 7A to 7C are flowcharts that show the procedures of a routing protocol according to an embodiment of the present invention. Referring to FIGS. 7A to 7C, when a data packet is created in a source node 110, whether information about a route from the source node to a destination node 120 exists is checked at steps S710 and S711. If there is no route, a route setup process is started and a Route Request (RREQ) packet is created at step S731. This packet is propagated through flooding over a network, as in the Ad hoc On-demand Distance Vector (AODV) routing method.

During the flooding process, intermediate nodes update a routing table (Update Routing Table: URT). When the RREQ packet reaches the destination node 120, the destination node 120 creates an RREP packet in response thereto at steps S715 and S717. The RREP packet backtracks by unicast using the routing table information in the intermediate nodes 710, which were set when the RREQ packet was propagated, and reaches the source node 110 at step S719. In the source node, an RREQ timer was set when the RREQ packet was transmitted. If the RREP packet reaches the source node before this timer expires, the RREQ timer is deleted at step S720, but if not, the RREQ packet is retransmitted when the timer expires at step S710.

After the route setup process, data are transmitted to the destination node at steps S730 and S731 along the route that was established when the RREP packet was delivered. Here, each of the nodes on the route along which data are transmitted becomes an active session node (ASN), and the ASN starts the process of transmitting and receiving RERR packets (RERR Tx/Rx process) and the process of transmitting and receiving Hello messages (Hello Tx/Rx process). Also, an ACK packet may be delivered from the destination node 120 to the source node 110 in response to the reception of the data at steps S733 and S735.

Also, when the RREP packet reaches the source node 110, the source node 110 periodically creates a forward exploitation ant (FEIANT) packet. To this end, a FEIANT timer is set. Whenever the FEIANT timer expires, the FEIANT packet is created and forwarded to the destination node at steps S737 and S739. Here, the packet is forwarded by unicast along the best route to the destination node 120, which is based on the above-described route maintenance process. When the FEIANT packet reaches the destination node 120, a backward exploitation ant (BEIANT) packet is created and delivered to the source node 110 along the reverse path at steps S740 and S741. While the FEIANT packet and the BEIANT packet are transmitted, the intermediate node 710 updates a routing table and starts the process of transmitting and receiving a Hello+ message (Hello+ Tx/Rx process).

When the BEIANT packet reaches the source node 110, the source node 110 periodically creates a forward exploration ant (FERANT) packet. To this end, a FERANT timer is set. Whenever the FERANT timer expires, the FERANT packet is created and searches for a route to the destination in a probabilistic manner at steps S743, S745, and S747. When the FERANT packet reaches the destination node 120, a backward exploration ant (BERANT) packet is created in response thereto and is forwarded to the source node at steps S749 and S750 along a route that is the reverse to the route along which the FERANT packet was transmitted. While the FERANT packet and the BERANT are transmitted, the intermediate node updates a routing table for the newly found route.

In FIGS. 7A to 7C, "URT" represents "Update Routing Table", "F" represents "Forward", "R" represents "Reverse", "A" represents "Active", and "I" represents "Inactive".

FIG. 8A is a flowchart of the process of transmitting a Route Error (RERR) packet (RERR Tx) according to an embodiment of the present invention, and FIG. 8B is a flowchart of the process of receiving the RERR packet (RERR Rx). Referring to FIG. 8A and FIG. 8B, when the active session node (which is one of the nodes on the route along which data are transmitted) receives and forwards data, if there is no information about the route to the destination because topology is changed due to the movement of nodes or the like, the active session node broadcasts an RERR packet at steps S810, S811, and S813. Also, the node that receives the RERR packet updates a corresponding routing table using the RERR packet. That is, at steps S820 and S821, the node deletes routing information about the node that broadcast the RERR packet. If the node that receives the RERR packet is a source node and has no information about the route to the destination, the node transmits a Route Request (RREQ) packet at steps S830 and S831, but if the node that receives the RERR packet is an active session node and has no information about the route to the destination node 120, the node transmits the RERR packet again at steps S840 and S841.

Figure 9A:
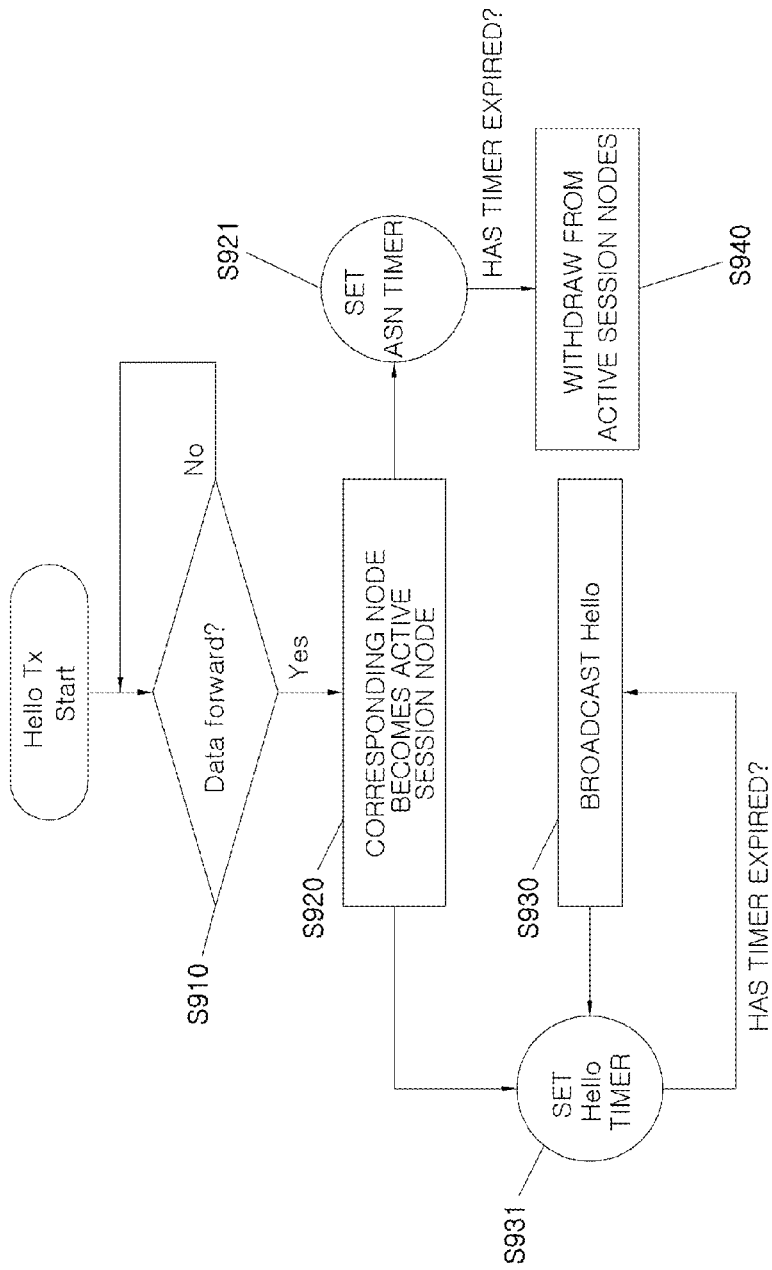
FIG. 9A is a flowchart of the process of transmitting a Hello message.
Figure 9B:
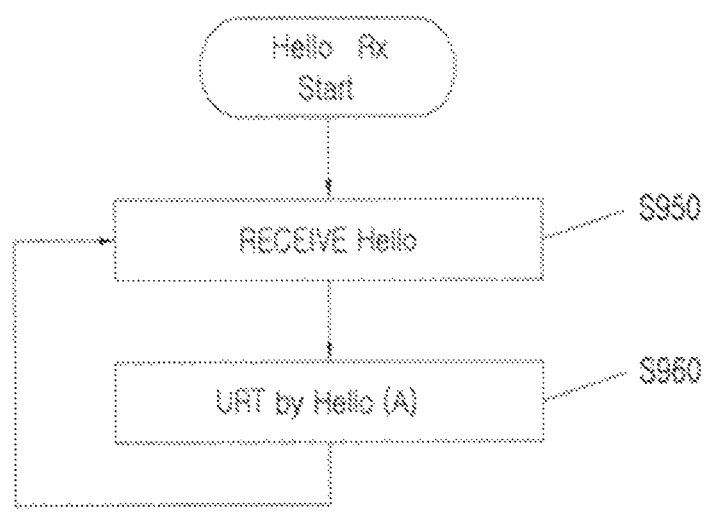
FIG. 9B is the process of receiving a Hello message.

FIG. 9A is a flowchart of the process of transmitting a Hello message (Hello Tx), and FIG. 9B is a flowchart of the process of receiving a Hello message (Hello Rx). Referring to FIG. 9A and FIG. 9B, the node that forwards data becomes an active session node and sets an ASN timer at steps S910, S920, and S921. Before the ASN timer expires, a Hello message is periodically broadcast at step S930. Here, in order to periodically broadcast the Hello message, a Hello timer is set at step S931. When the ASN timer expires, the corresponding node withdraws from the set of active session nodes at step S940. The node that received the Hello message checks neighboring nodes and updates the related routing table information at steps S950 and S960.

Figure 10A:
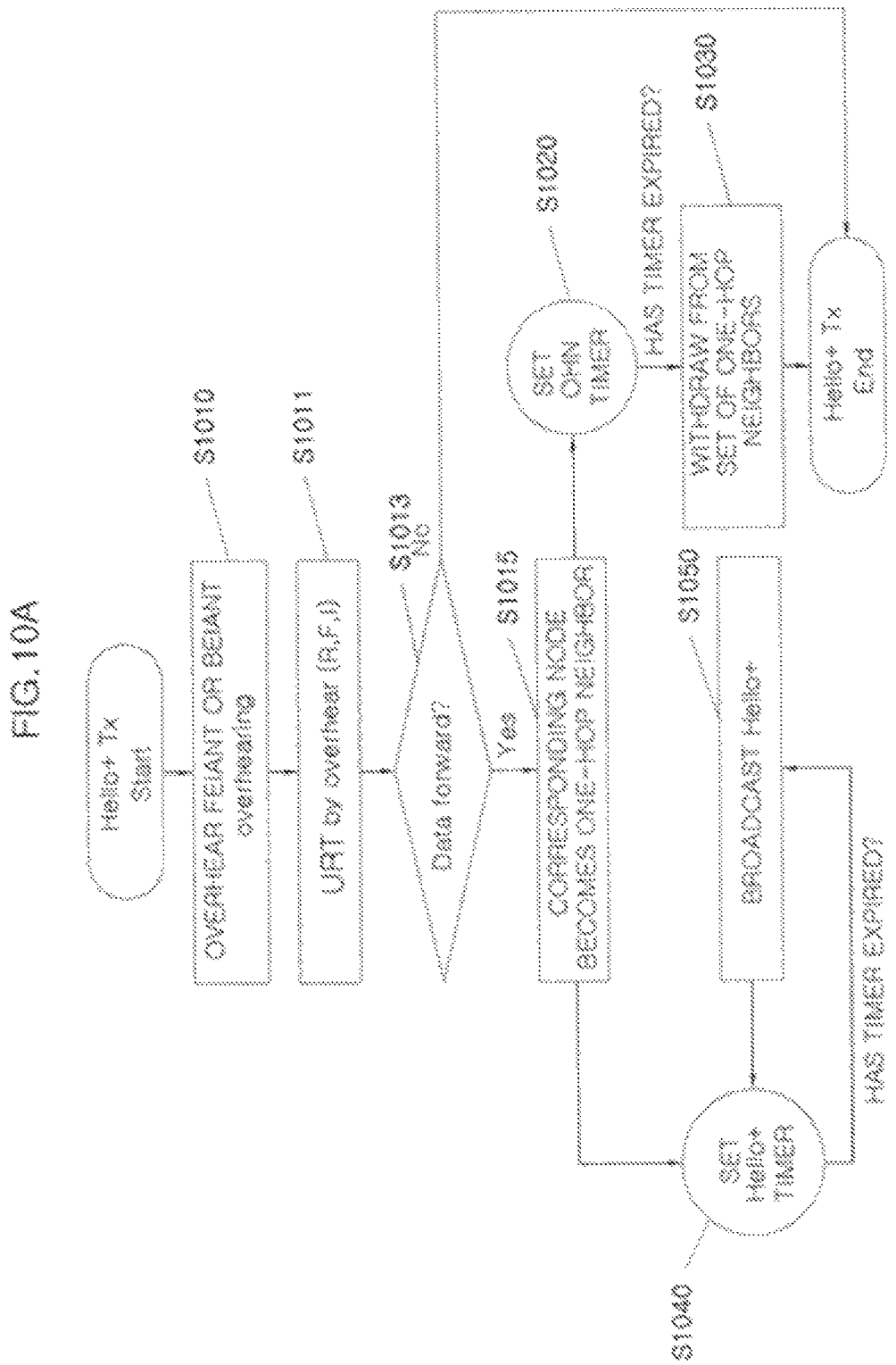
FIG. 10A is a flowchart of the process of transmitting a Hello+ message.
Figure 10B:
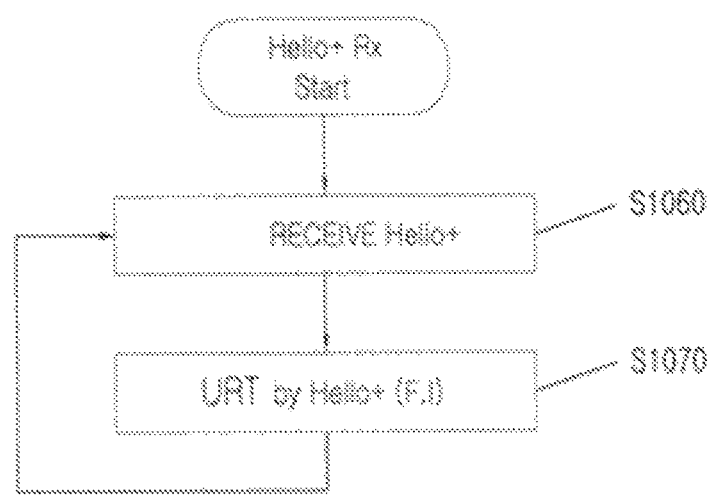
FIG. 10B is the process of receiving a Hello+ message.

FIG. 10A is a flowchart of the process of transmitting a Hello+ message (Hello+ Tx). FIG. 10B is a flowchart of the process of receiving a Hello+ message (Hello+ Rx). Referring to FIG. 10A and FIG. 10B, the node that overhears the FEIANT or BEIANT packet updates the related information in the routing table based on the information acquired through overhearing at steps S1010 and S1011. A detailed description thereof has been made with reference to the overhearing process.

Subsequently, the node that receives both the FEIANT packet and the BEIANT packet, which have the same sequence number (SN), becomes a one-hop neighbor and broadcasts a Hello+ message at steps S1013 and S1015. Here, in order to periodically broadcast the Hello+ message, a Hello+ timer is set at step S1040. When a node becomes a one-hop neighbor, a one-hop neighbor (OHN) timer is set, and when this timer expires, the node withdraws from the set of one-hop neighbors at steps S1020 and S1030. The node that received the Hello+ message checks the best pheromone information included in the Hello+ message, and updates the related routing table information. A detailed description thereof has been made with reference to the pheromone diffusion process.

Figure 11:
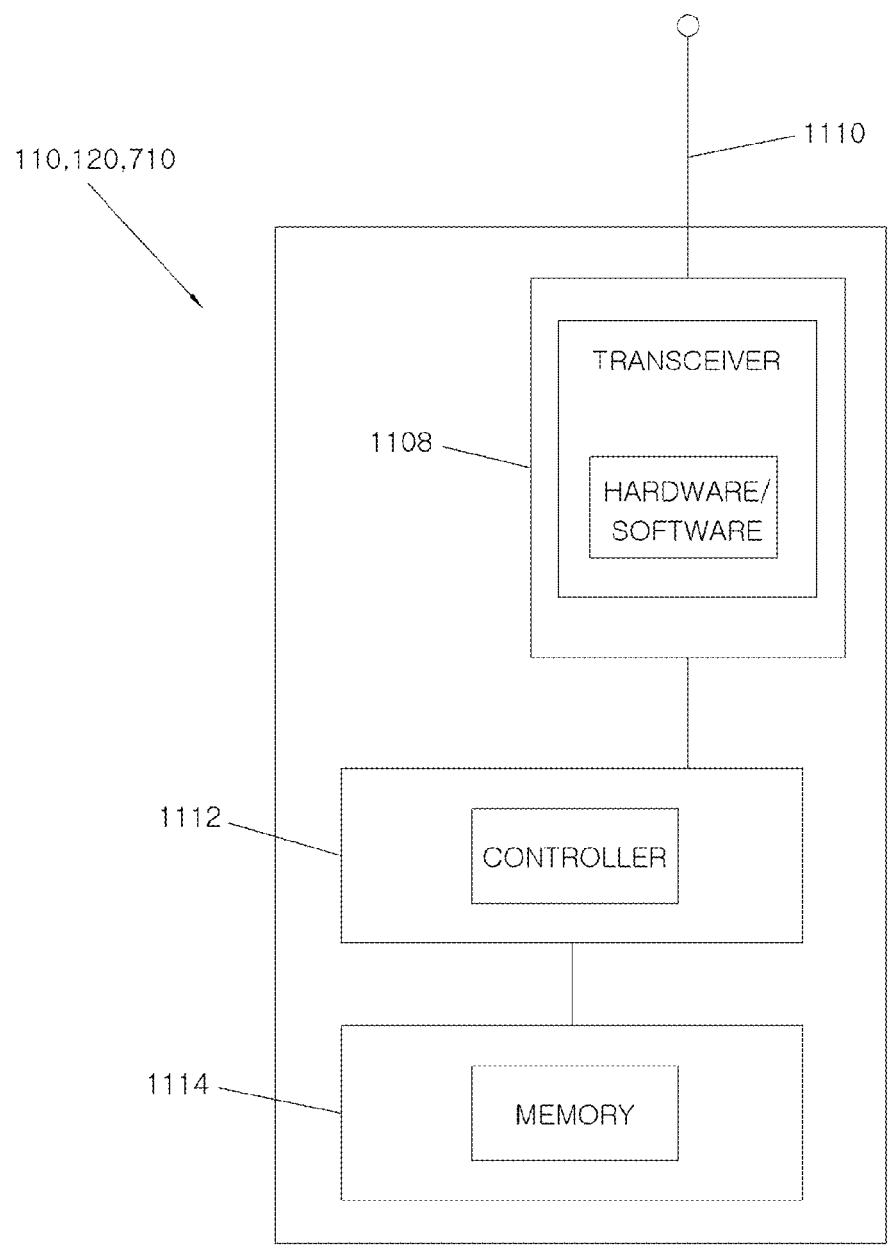
FIG. 11 is a block diagram illustrating an example of the node illustrated in FIG. 7.

FIG. 11 is a block diagram illustrating an example of the node illustrated in FIG. 7. Referring to FIG. 11, each of the nodes 110, 120, and 710 includes a transceiver 1108 combined with an antenna 1110, and may transmit/receive signals, such as packetized signals or the like, to/from the node 110, 120 or 710 under the control of the controller 1112.

Each of the nodes 110, 120 and 710 further includes memory 1114 for storing information about itself or another node, which routes information over a network. The memory 1114 may be memory arranged within the controller 1112, but may alternatively be separate memory. Accordingly, the memory may be configured as a combination of non-volatile memory, such as a flash memory disk (a Solid State Drive (SSD)), a hard disk drive, flash memory, Electrically Erasable Programmable Read-Only Memory (EEPROM), Static RAM (SRAM), Ferro-electric RAM (FRAM), Phase-change RAM (PRAM), Magnetic RAM (MRAM), or the like, and/or volatile memory, such as Dynamic Random Access Memory (DRAM), Synchronous Dynamic Random Access Memory (SDRAM), Double Data Rate-SDRAM (DDR-SDRAM), or the like.

The nodes 110, 120, and 710 may also include appropriate hardware and software for implementing Internet Protocol (IP), Address Resolution Protocol (ARP), Transmission Control Protocol (TCP), and User Datagram Protocol (UDP), which may be easily understood by those skilled in the art. Particularly, the nodes may include appropriate hardware and/or software for implementing the bio-inspired routing protocol using overhearing and/or probabilistic path finding in a mobile ad hoc network.

According to the present invention, because only one-hop neighbors of the route from a source to destination periodically transmit a Hello message, control packet transmission overhead may be significantly reduced compared to the conventional method.

Also, the present invention is advantageous in that routing performance, which influences end-to-end delay and delay variance, is superior to the conventional method because alternative route exploration is performed within one-hop coverage of the route from a source to a destination.

Also, in the routing protocol according to the present invention, an alternative route is searched for near the route from a source to destination within one-hop coverage using an overhearing function, whereby a stagnation problem that affects the existing routing method may be solved, and the occurrence of link failure may be reduced by acquiring up-to-date routing information.

What is claimed is:

1. A method for providing a bio-inspired routing protocol using overhearing and probabilistic path finding in a mobile ad hoc network including multiple nodes, the method comprising:
    (a) transmitting, by a source node and a destination node, a data packet and an exploitation ant packet along a single route therebetween in both directions, the source node and the destination node being selected from among the multiple nodes;
    (b) overhearing, by remaining nodes, the data packet and the exploitation ant packet, the remaining nodes being acquired by excluding nodes on the single route from the multiple nodes;
    (c) determining one-hop neighbors, among the remaining nodes, through the overhearing, and determining a one-hop coverage range formed by a communication range of the one-hop neighbors;
    (d) updating, by the one-hop neighbors, pheromone information through the overhearing, and sending, by the one-hop neighbors, best pheromone information for traveling to the destination node based on the updated pheromone information; and
    (e) setting an alternative route in such a way that the source node creates an exploration ant packet based on the updated pheromone information and performs alternative route sampling through probabilistic path finding,
    wherein the routing protocol includes:
    routing table information management for managing information about multiple routes;
    route setup for establishing a route;
    overhearing for determining the one-hop neighbors of the route from the source node to the destination node;
    pheromone diffusion for diffusing the pheromone information within a predetermined range of the route from the source node to the destination node using the overhearing and transmission and reception of a specific message by the one-hop neighbors;
    route management for maintaining the established route;
    data forwarding for selecting a next hop in a probabilistic manner based on the pheromone information; and
    route recovery for informing a preceding node that there is no transmission route when there is no route along which a data packet is to be transmitted,
    wherein the routing table information management is configured to additionally manage an update time, pheromone information, and status information, and
    wherein the status information is set as an active status when the status information is acquired through the data packet, the exploitation ant packet or the exploration ant packet, but the status information is set as an inactive status when the status information is acquired through the overhearing or a message that includes the exploration ant packet.

2. The method of claim 1, wherein the route management is configured to perform route sampling in a probabilistic manner in order to prepare for link failure.

3. The method of claim 1, wherein the alternative route sampling is performed within the one-hop coverage range.

4. The method of claim 1, wherein the pheromone information is defined as the following equation;

$$\tau_{ij}^{d} = (1/c_{ij}^{d})^{\alpha}(1/t_{ij}^{d})^{\beta}$$

where $\tau_{ij}^{d}$ denotes a pheromone for a route from the node i to the destination d via the next node j, $c_{ij}^{d}$ denotes a cost for the corresponding route, $t_{ij}^{d}$ denotes a time elapsed after corresponding information is updated, and $\alpha$ and $\beta$ denote weighted constants.

5. The method of claim 1, wherein;
the active status is switched to the inactive status when a preset timer expires;
the status information having the inactive status is deleted when a preset second timer expires; and
the active status is used only to forward the data packet and the exploitation ant packet and the inactive status is used only to forward the exploration ant packet.

6. The method of claim 1, wherein:
the source node creates a forward exploitation ant packet and transmits the forward exploitation ant, packet to the destination node;
the destination node creates a backward exploitation ant packet corresponding to the forward exploitation ant packet and transmits the backward exploitation ant packet to the source node; and
nodes on a route along which the forward exploitation ant packet and the backward exploitation ant packet are transmitted update the routing table information.

7. The method of claim 1, wherein:
in order to secure the alternative route after the single route is established, the source node creates a forward exploration ant packet, selects a node corresponding to a next hop in a probabilistic manner based on the pheromone information among the routing table information having an inactive status, and transmits the forward exploration ant packet; and
the destination node creates a backward exploration ant packet corresponding to the forward exploration ant packet and transmits the backward exploration ant packet,
wherein the backward exploration ant packet travels to the source node backward along a route along which the forward exploration ant packet traveled.

8. The method of claim 1, wherein the route recovery is configured to periodically perform the alternative route sampling using a multi-path routing method.

9. A system for providing a bio-inspired routing protocol using overhearing and probabilistic path finding in a mobile ad hoc network including multiple nodes,
the system being configured such that:
a source node and a destination node, which are selected from among the multiple nodes and form a single route therebetween, transmit a data packet and an exploitation ant packet in both directions along the single route, remaining nodes, acquired by excluding nodes on the single route from the multiple nodes, overhear the data packet and the exploitation ant packet, one-hop neighbors are selected from among the remaining nodes through the overhearing, and a one-hop coverage range is determined by a communication range of the one-hop neighbors, wherein:

the one-hop neighbors update pheromone information through the overhearing and send best pheromone information for traveling to the destination node based on the updated pheromone information; and the source node creates an exploration ant packet based on the updated pheromone information and performs alternative route sampling through probabilistic path finding, whereby an alternative route is established, wherein the routing protocol includes:

routing table information management for managing information about multiple routes;

route setup for establishing a route;

overhearing for determining the one-hop neighbors of the route from the source node to the destination node;

pheromone diffusion for diffusing the pheromone information within a predetermined range of the route from the source node to the destination node using the overhearing and transmission and reception of a specific message by the one-hop neighbors;

route management for maintaining the established route;

data forwarding for selecting a next hop in a probabilistic manner based on the pheromone information; and route recovery for informing a preceding node that there is no transmission route when there is no route along which a data packet is to be transmitted, wherein the routing table information management is configured to additionally manage an update time, pheromone information, and status information, wherein the status information is set as an active status when the status information is acquired through the data packet, the exploitation ant packet or the exploration ant packet, but the status information is set as an, inactive status when the status information is acquired through the overhearing or a message that includes the exploration ant packet, wherein:

the active status is switched to the inactive status when a preset timer expires;

the status information having the inactive status is deleted when a preset second timer expires; and the active status is used only to forward the data packet and the exploitation ant packet and the inactive status is used only to forward the exploration ant packet.

* * * * *